United States Patent [19]

Lin et al.

[11] Patent Number: 5,724,206
[45] Date of Patent: Mar. 3, 1998

[54] PROTECTIVE COVER OPENING MECHANISM FOR A CASSETT LOADING AND UNLOADING APPARATUS FOR CASSETTE RECORDERS

[75] Inventors: Pi-Ling Lin, Changhua; Sen-Yuan Chien, Ilan; Hsin-Ching Wei, Kaoshiung, all of Taiwan

[73] Assignee: Industrial Technology Research Institute, Hsinchu, Taiwan

[21] Appl. No.: 528,016

[22] Filed: Sep. 14, 1995

[51] Int. Cl.⁶ ............................................. G11B 5/008
[52] U.S. Cl. .................................... 360/96.5; 360/94
[58] Field of Search ............................ 360/96.5, 96.6, 360/96.1, 93, 90, 99.06, 132, 133; 369/77.2, 291

[56] References Cited

U.S. PATENT DOCUMENTS

| | | | |
|---|---|---|---|
| 5,406,430 | 4/1995 | Shinohara et al. | 360/96.5 |
| 5,434,727 | 7/1995 | Kage et al. | 360/96.5 |
| 5,442,501 | 8/1995 | Kaneko et al. | 360/94 |
| 5,483,395 | 1/1996 | Shinohara | 360/96.5 |
| 5,523,908 | 6/1996 | Shinohara | 360/96.6 |
| 5,543,993 | 8/1996 | Argumedo et al. | 360/132 |

FOREIGN PATENT DOCUMENTS

| | | | |
|---|---|---|---|
| 60-63781 | 4/1985 | Japan | 360/96.5 |
| 6-20353 | 1/1994 | Japan | 360/96.5 |
| 6-124516 | 5/1994 | Japan | 360/96.5 |

*Primary Examiner*—Robert S. Tupper
*Assistant Examiner*—Brian E. Miller
*Attorney, Agent, or Firm*—Beveridge, DeGrandi, Weilacher & Young LLP

[57] ABSTRACT

The present invention is a protective cover opening mechanism for cassette loading and unloading apparatus of a digital compact cassette (DCC) or analog compact cassette (ACC). The apparatus consists of a sliding plate, a turning arm, a spline, and a stretching spring. The end surface of the sliding plate has an inclined plane with a concave channel at its bottom with an end part with the first pulling hook. There is a sliding slot on the sliding plate and the spline is fitted into this sliding slot. The spline shaft is attached to one end of the turning arm. The turning arm has a second pulling hook and there is a stretching spring connected between the first and second pulling hooks. The turning arm has a fixed pin, which when a DCC is inserted moves the fixed pin along the inclined plane of the sliding plate and while moving opens the protective cover. If an ACC is inserted, the fixed pin slides along the outer edge only and does not affect the ACC at all. When the DCC or ACC is ejected, it will return all the relevant moving elements to their original positions.

2 Claims, 6 Drawing Sheets

5,724,206

PROTECTIVE COVER OPENING MECHANISM FOR A CASSETT LOADING AND UNLOADING APPARATUS FOR CASSETTE RECORDERS

FIELD OF THE INVENTION

A protective cover opening mechanism for a cassette loading and unloading apparatus of a digital compact cassette recorder (DCC) by use of the DCC's sliding plate profile to guide the fixed pin to open the protective cover of the DCC.

BACKGROUND OF THE INVENTION

Conventionally, all DCCs possess a protective cover. In order that the protective cover can be opened smoothly to facilitate the loading action when the DCC is placed inside the cassette bearing seat, the apparatus makes use of the conventional protective cover of the DCC of opening apparatus shown in the schematic diagram of FIG. 1 and FIG. 2. As the DCC is inserted into the cassette bearing seat (the DCC structure is not shown), the pin 111 of the rocker arm 11 end part exactly touches the protective cover 211 side-edge of the DCC 21. If one presses the DCC 21 inward again, the rocker arm 11 is subjected to pressure to push the protective cover 211 which makes the fan-shaped gear 113 mesh with the rack 12, thereby moving the turning axis 112 along the sliding slot 13. And the pin 111 of the turning arm 11 end part presses against the protective cover 211 of the DCC 21, thereby to push open the protective cover 211 until the protective cover is completely pushed open to facilitate the finishing action of tape loading.

The conventional technique makes use of the double action of the rack and long slot to guide the opening of the protective cover. The conventional technique requires numerous elements, and the structure is rather complicated; consequently, the manufacturing cost is also very high. In light of the various disadvantages of the conventional techniques as mentioned above, the inventor makes an innovative improvement.

SUMMARY OF THE INVENTION

The main purpose of the present invention is to provide a protective cover opening mechanism for digital compact cassette (DCC) loading and unloading apparatus. It makes use of the cassette insertion to push the cassette sliding plate and activate the turning arm to move along the sliding slot. In the meantime, the apparatus presses the fixed pin at the end of the turning arm against the protective cover of outside edge of the DCC and while the DCC is being inserted the fixed pin is able to slide along the sliding plate's inclined plane, thereby to attain the function of the opening of the protective cover of the DCC. If the inserted cassette is an analog compact cassette (ACC), the fixed pin of the apparatus moves only along the cassette outer edge and will not affect the ACC loading and unloading action at all. The present invention is applicable to both DCC and ACC. The apparatus also possesses the effects of simple structure and positive action.

For a fuller understanding of the nature and advantages of the invention, reference should be made to the ensuing detailed description taken in conjunction with the accompanying drawings.

BRIEF DESCRIPTION OF THE DRAWINGS

FIG. 4(a) is a sideview of FIG. 4.

BRIEF DESCRIPTION OF THE PART NUMBERS SHOWN IN THE FIGURES

Figure 1:
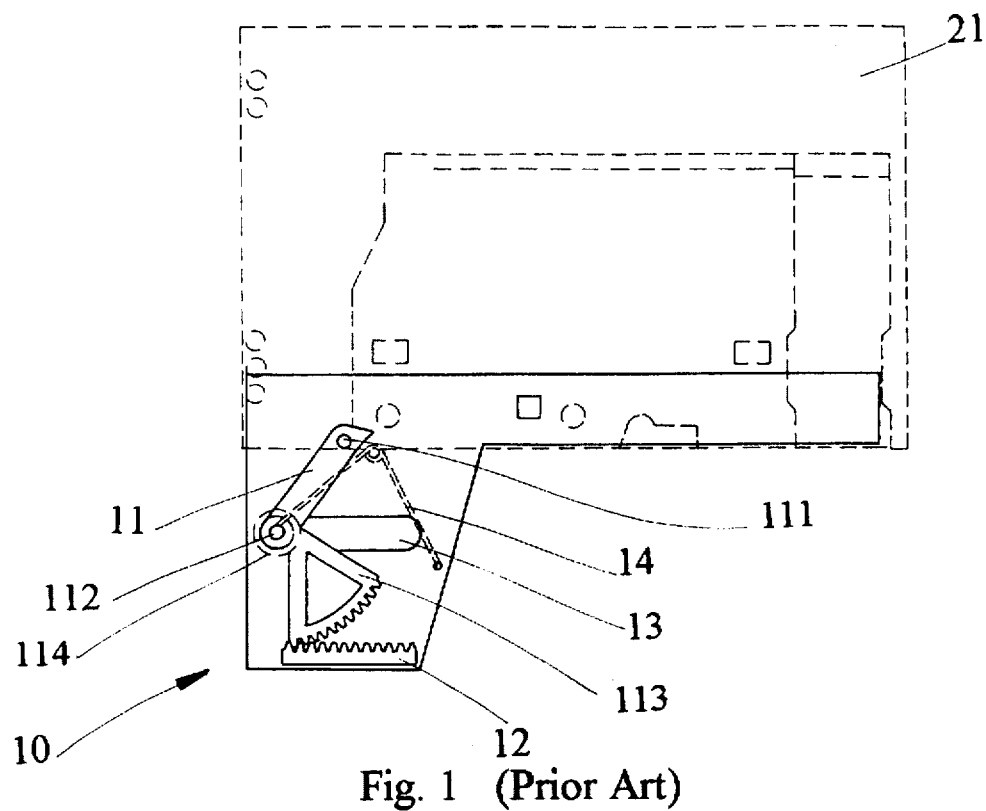
FIG. 1 is a schematic diagram of a conventional opening mechanism for DCC protective covers.

10 Conventional protective cover opening mechanism
11 Rocker arm
111 Pin
112 Turning axis
113 Fan-shaped gear
114 Barrel
12 Rack
13 Long Slot
14 Recoiled spring
20 ACC
21 DCC
211 Protective cover
30 Protective cover opening mechanism
31 Sliding plate
311 Inclined plan
312 First pulling hook
313 Concave channel
32 Turning arm
321 Fixed pin
322 Spline shaft
323 Second pulling hook
33 Stretching spring
35 Cassette bearing seat
36 Sliding slot

DETAILED DESCRIPTION OF THE INVENTION

Figure 2:
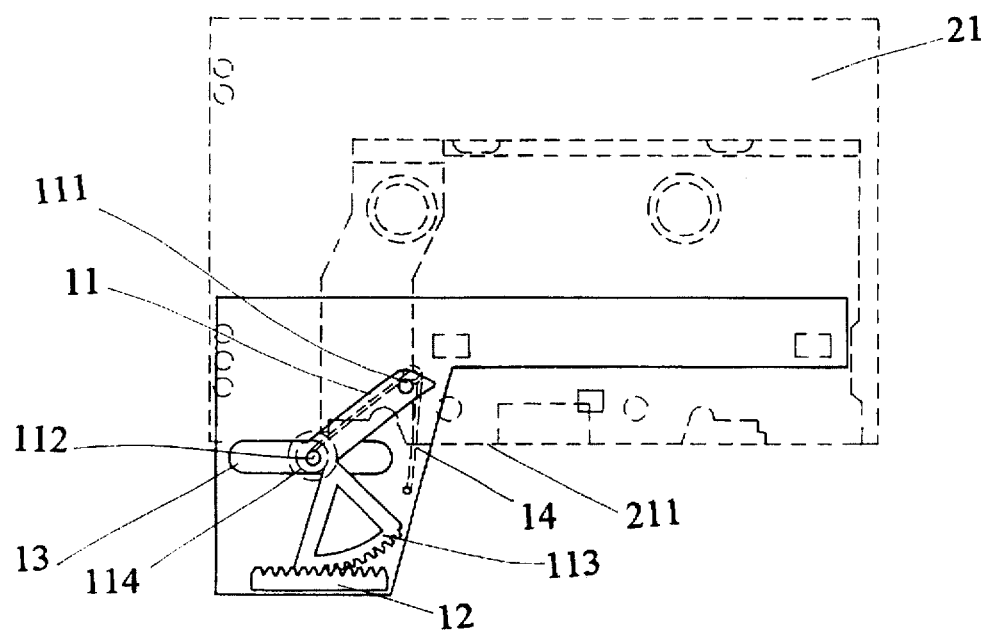
FIG. 2 is a schematic diagram of the opening action position of the opening mechanism for DCC cassette protective covers.

Please refer to FIG. 1 which is the schematic diagram of a conventional protective cover opening mechanism for a DCC wherein the opening mechanism 10 has a rocker arm 11 with one end with a pin 111 and the other end consists of a fan-shaped gear 113. The rocker arm 11 and the fan-shaped gear 113 are integrated parts. There is a rack 12 set up at a location to engage the fan-shaped gear 113. There is a turning axis 112 set up at the appropriate location on the rocker arm 11. There is a barrel 114 covered at the turning axis 112. The barrel 114 is fitted in the long slot 13 to perform reciprocating movement along the long slot 13. The turning axis 112 is covered by an end of a recoiled spring 14. The other end of this recoiled spring 14 is connected to an appropriate place on the opening mechanism 10. Referring again to FIG. 2 which shows a DCC protective cover 211 in the open position in an conventional mechanism. As the DCC 21 is placed into the cassette bearing seat (its structural diagram is not shown in FIG. 2), the pin 111 at the rocker arm 11 end touches the side of the protective cover 211 of the DCC 21. If a DCC 21 is pressed further the cassette bearing seat, the rocker arm 11 is pressed to push the protective cover 211 and the fan-shaped gear 113 meshs with rack 12. The turning axis 112 moves along the long slot 13, and the pin 111 at the end of the rocker arm 11 opens the protective cover 211 of the DCC 21. The tape loading action will not be finished until the protective cover 211 is completely pushed open.

Figure 3:
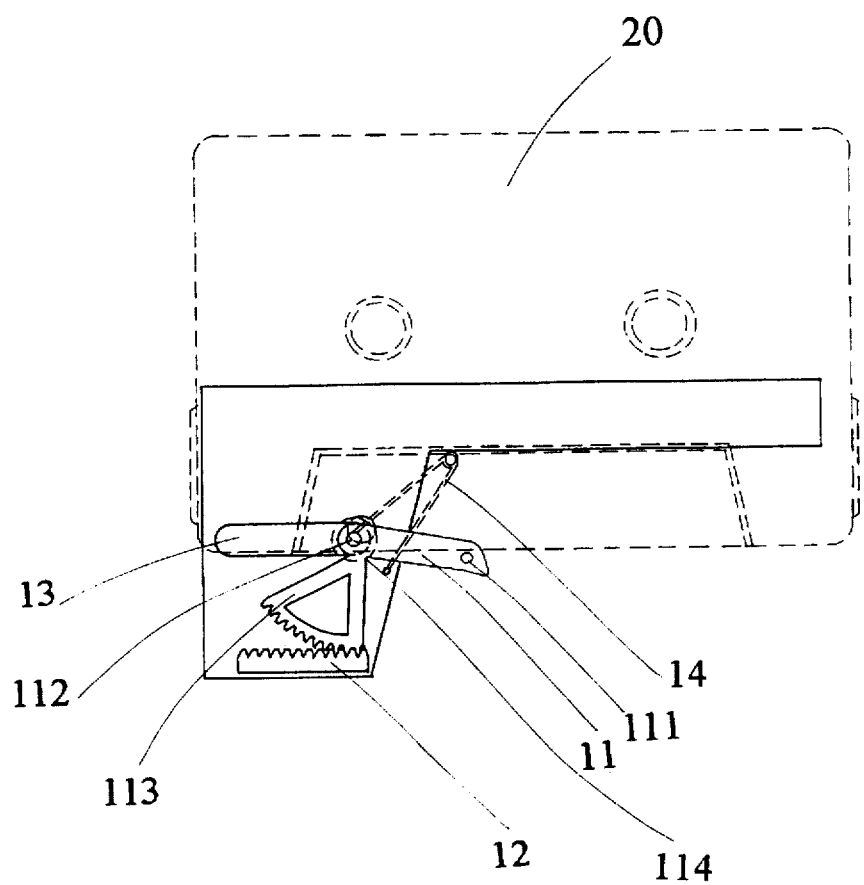
FIG. 3 is a schematic diagram of a conventional apparatus when an ACC is inserted.

FIG. 3 is the schematic diagram shows a conventional opening mechanism 10 with a ACC. As an ACC 20 is inserted into the cassette bearing seat, the rocker arm 11 is pressed by ACC 20 which slides the turning axis 112 slide toward the other end of the siding slot 13 since there is no protective cover 211 on the ACC 20. And the rocker arm 11 also moves to the most limited position as shown in FIG. 3, to facilitate the completion of tape loading. When a cassette is unloading (ACC or DCC), the cassette uses the torsional force of the recoiled spring 14 to return each element back to their original positions.

Figure 4:
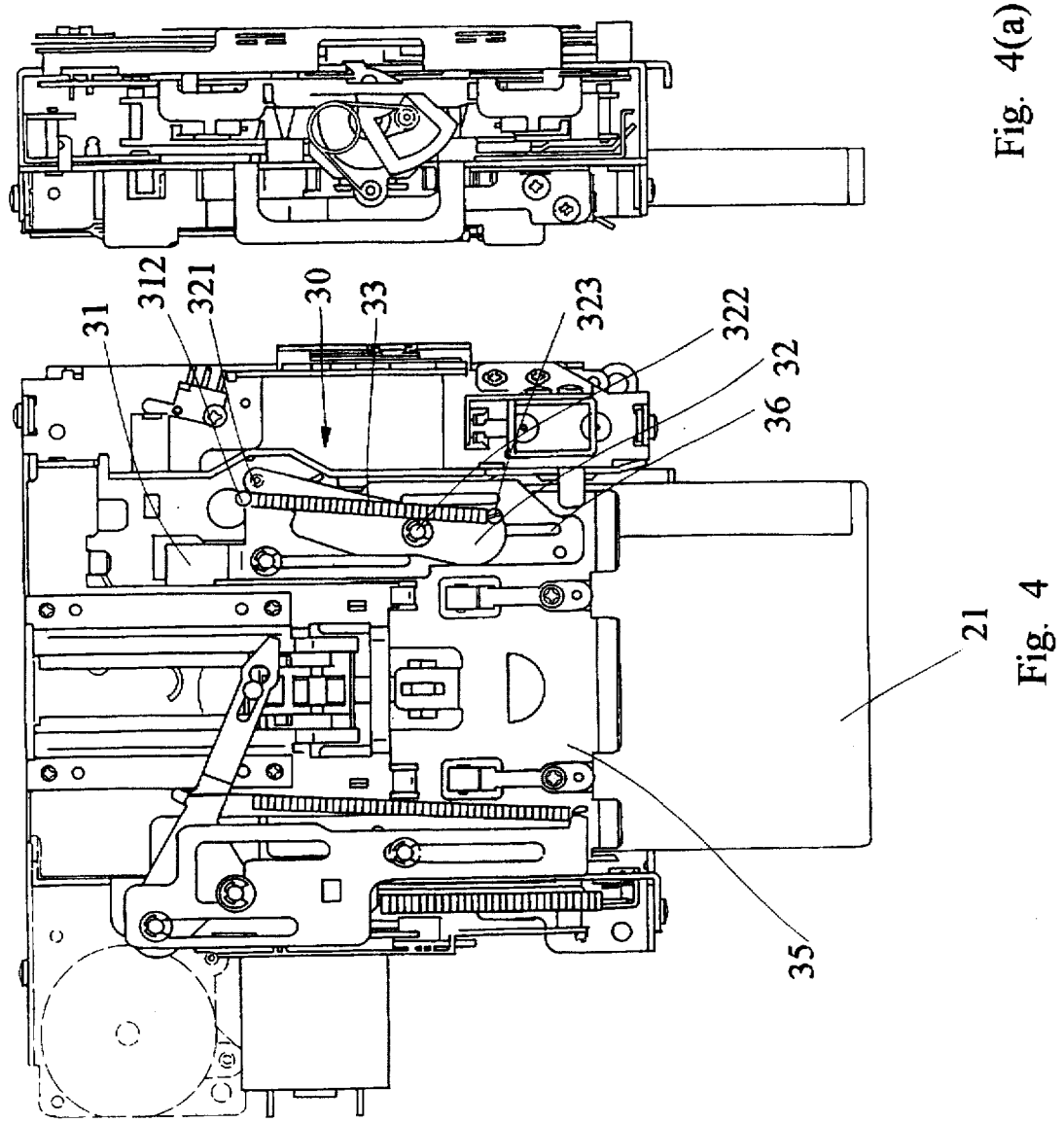
FIG. 4 is the preferred embodiment of the protective cover opening mechanism for DCCs.

Please refer to FIG. 4 which is the preferred embodiment of the protective cover opening apparatus of the present invention. The opening mechanism 30 of the present invention consists of a sliding plate 31 wherein one side of the sliding plate 31 is an inclined plane 311 and the end part of which has a first pulling hook 312 set up and having a turning arm 32 on it. One end of the turning arm 32 has a fixed pin 321, while the other end is attached to a spline shaft 322, which is fitted in a sliding slot 36. The turning arm 32 whose end part has a second pulling hook 323. A stretching spring 33 is connected between the first pulling hook 312 and the second pulling hook 323.

Figures 5, 5A:
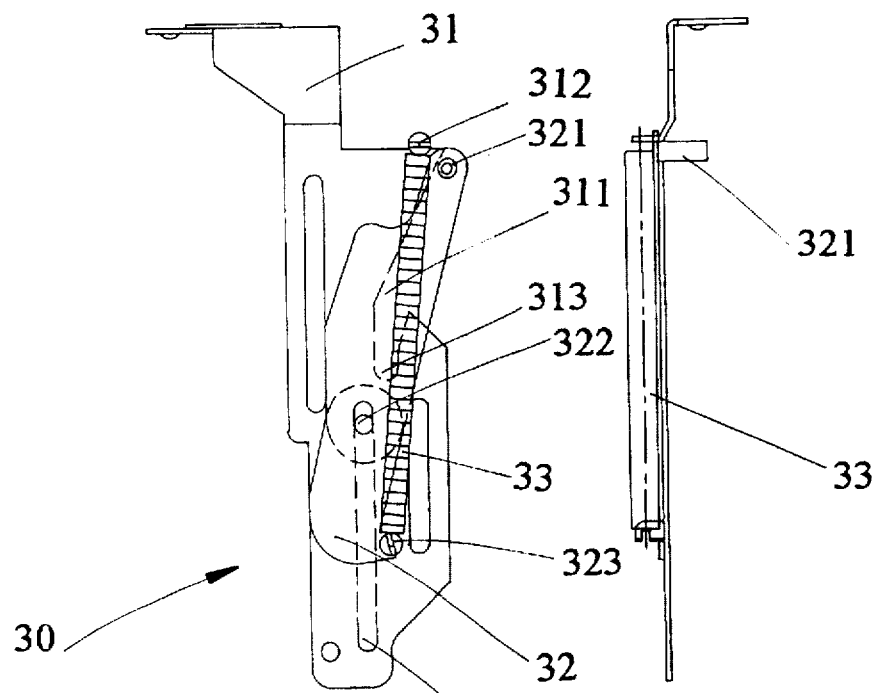
FIG. 5 is the schematic diagram of the preferred embodiment protective cover opening mechanism for DCCs.
FIG. 5(a) is a side view of FIG. 5.

FIG. 5 is the schematic diagram of the protective cover opening apparatus of the present invention. This protective cover opening apparatus consists of a sliding plate 31, a spline shaft 322, a stretching spring 33 and a turning arm 32. The sliding plate 31 is installed on the cassette bearing seat (shown in FIG. 4) and its end surface has a inclined plane 311 which is identical to the one in the protective cover 211 of the DCC cassette 21. The end part of the inclined plane 311 has a first pulling hook 312 connected to an end of a stretching spring 33. There is a sliding slot 36 on the sliding plate 31 to hold a fit-in spline shaft 322. There is a turning arm 32 connected to the spline shaft 322. The end part of the turning arm 32 connects to a fixed pin 321, and the other end of the turning arm 32 has a second pulling hook 323 connected to the other end of the stretching spring 33.

Figures 6, 6A:
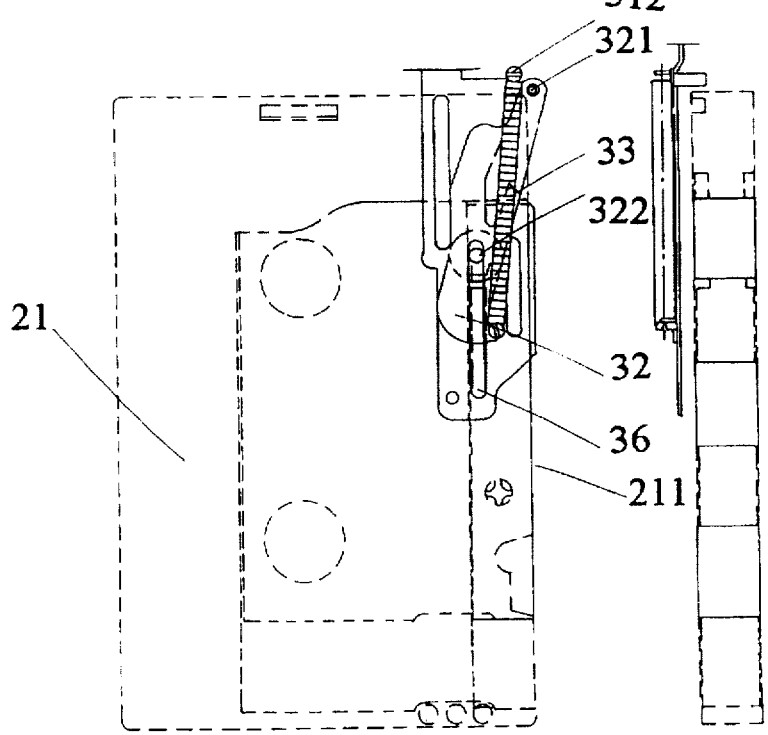
FIG. 6 is the schematic diagram of the initial position when the apparatus is opening a DCC cover.
FIG. 6(a) is a side view of FIG. 6.
Figures 7, 7A:
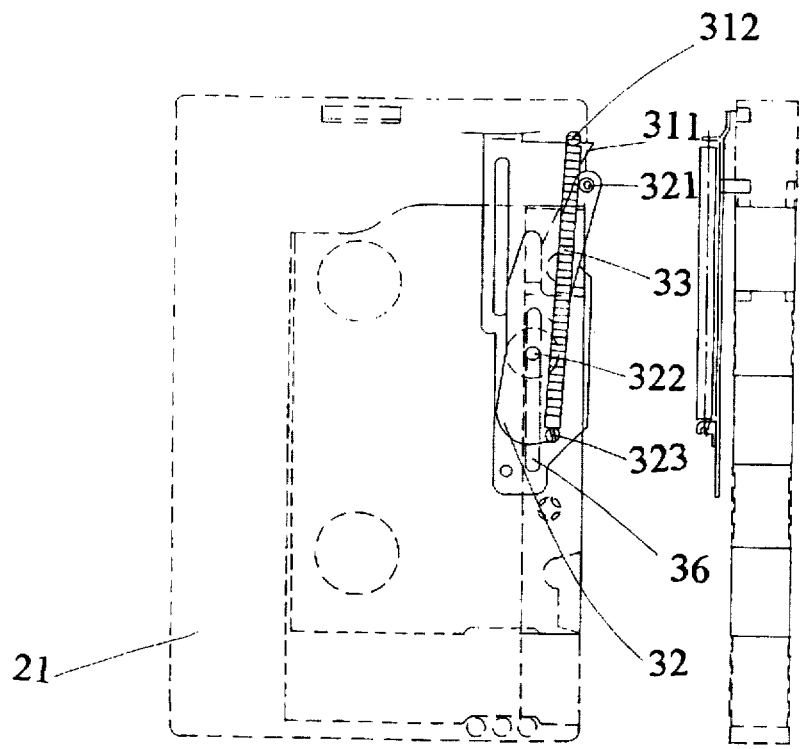
FIG. 7 is the schematic diagram prior to opening the cover of a DCC.
FIG. 7(a) is a side view of FIG. 7.
Figures 8, 8A:
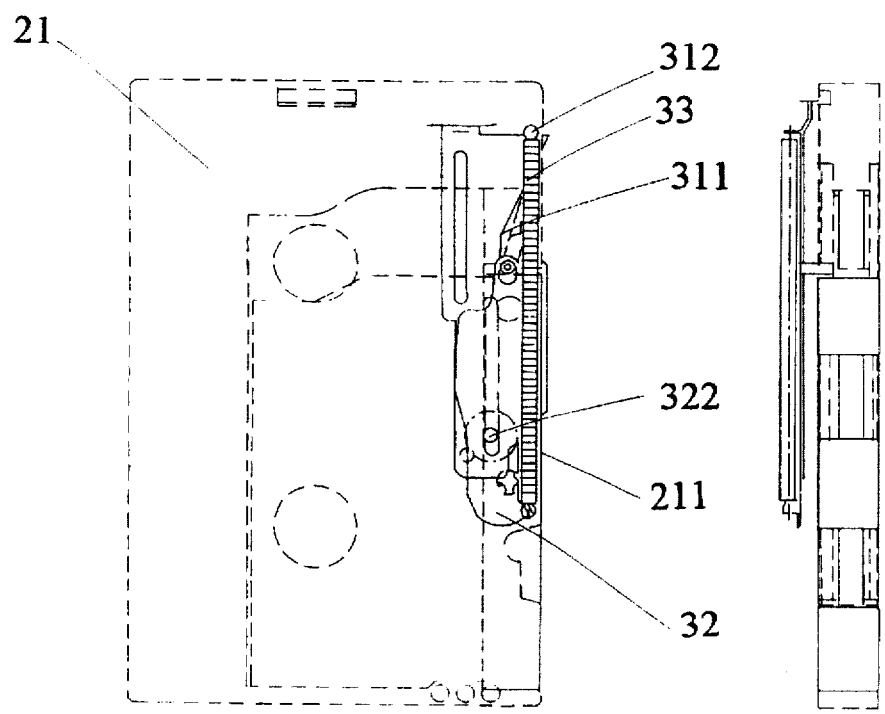
FIG. 8 is the schematic diagram of the position when it finishes opening the cover of a DCC.
FIG. 8(a) is a side view of FIG. 8.

FIG. 6 shows a schematic diagram when the opening mechanism 30 is at its initial position ready to open a DCC. The DCC 21 is placed on the bearing seat 35 to stop the sliding plate 31. The fixed pin 321 of the turning arm 32 is exactly placed on the outer edge (as shown in FIG. 7) of the DCC protective cover 211. As the DCC 21 is inserted, the fixed pin 321 follows the guidance of the inclined plane 311 of the sliding plate 31 to slide forward in the direction of the protective cover 211. The fixed pin 321 pushes open that protective cover 211 until the fixed pin 321 slides to the concave channel 313 of the inclined plane 311 bottom. The fixed pin 321 fits into the concave channel 313, smoothly and positively opening the DCC protective cover 211 to complete the tape-loading action as shown in 8. During ejection of the DCC 21, it makes use of the stretching spring 33 recoiled force to return all the above-mentioned elements back to their original state to complete the DCC tape ejection (not shown in the figure).

Figures 9, 9A:
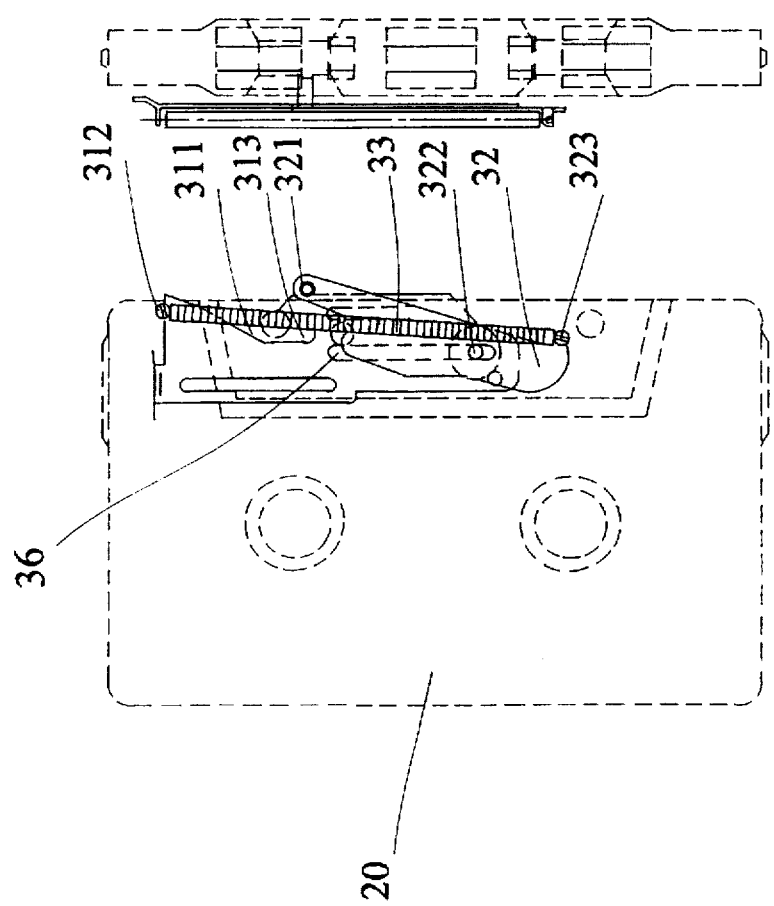
FIG. 9 is the schematic diagram of the state when an ACC is inserted into the present invention.
FIG. 9(a) is a side view of FIG. 9.

FIG. 9 is the schematic diagram of when an ACC is used in the present invention. The initial state is the same as that shown in FIG. 6 when the ACC cassette 20 is placed into the cassette bearing seat 35 of the present invention's opening mechanism 30. The fixed pin 322 of the turning arm 31 end part slides only along the ACC 20 edge, which will not affect the loading and unloading action of the ACC 20; because the ACC 20 does not have a protective cover. Hence, the present invention may be used with both DCCs and ACCs.

The above-mentioned structures are only some of the possible embodiments for this invention and should not be used as a limitation of the scope of the present invention. Equivalents and modifications according to the scope of patent application of the present invention belong to the scope covered by the present invention.

What is claimed is:

1. A protective cover opening mechanism for a cassette loading and unloading apparatus for a cassette recorder that receives an edge of a cassette adjoining a side of the cassette where a protective cover is located on a digital compact cassette (DCC) comprising:

a sliding plate connected to the cassette recorder, wherein an end surface of said sliding plate is an inclined plane with a concave channel at a bottom of said inclined plane, and said sliding plate having a first pulling hook at an end part of said sliding plate and a slot therein;

a spline shaft having one end within said slot, said spline shaft performs reciprocating motion along said slot;

a turning arm connected to said spline shaft, said turning arm having a second pulling hook thereon and a fixed pin thereon which is spaced from said second pulling hook;

a stretching spring having an end connected to the first pulling hook and having its other end connected to the second pulling hook;

whereby when the DCC is loaded in said recorder, said fixed pin first engages an outer edge of a protective cover of the DCC, and as the cassette is pushed forward into the recorder said spline shaft moves along said slot and drives said fixed pin along the inclined plane of said sliding plate until said fixed pin slides into the concave channel of the inclined plane and said stretching spring is stretched, and completes the opening action of the protective cover of the DCC;

when the DCC is unloaded from the recorder, said stretching spring returns to its original state and causes the protective cover opening mechanism to return to its original state that existed prior to loading of the DCC.

2. A protective cover opening mechanism for a cassette loading and unloading apparatus for a cassette recorder as claimed in claim 1, wherein as an analog compact cassette (ACC) is loaded into said recorder, the fixed pin slides only along an outer edge of the ACC and does not engage the outer edge of the ACC.

* * * * *